(12) United States Patent
Kano

(10) Patent No.: US 10,244,155 B2
(45) Date of Patent: Mar. 26, 2019

(54) IMAGE CAPTURING APPARATUS

(71) Applicant: CANON KABUSHIKI KAISHA, Tokyo (JP)

(72) Inventor: Akira Kano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/817,059

(22) Filed: Nov. 17, 2017

(65) Prior Publication Data

US 2018/0077336 A1 Mar. 15, 2018

Related U.S. Application Data

(63) Continuation of application No. 14/385,977, filed as application No. PCT/JP2013/001794 on Mar. 15, 2013, now Pat. No. 9,848,115.

(30) Foreign Application Priority Data

Mar. 21, 2012 (JP) .................. 2012-063901

(51) Int. Cl.
*G03B 13/00* (2006.01)
*H04N 5/225* (2006.01)
*G03B 17/00* (2006.01)
*H04N 5/232* (2006.01)
*G03B 17/14* (2006.01)
*H04N 5/235* (2006.01)
*H04N 5/357* (2011.01)

(52) U.S. Cl.
CPC ......... *H04N 5/23209* (2013.01); *G03B 17/14* (2013.01); *H04N 5/2351* (2013.01); *H04N 5/23212* (2013.01); *H04N 5/3572* (2013.01); *G03B 2206/00* (2013.01)

(58) Field of Classification Search
CPC ............. H04N 5/23248; H04N 5/2176; H04N 5/2257; H04N 5/23212; H04N 5/23219; G03B 17/20; G03B 7/097; G03B 7/28
USPC .......................................... 348/345; 396/529
See application file for complete search history.

(56) References Cited

U.S. PATENT DOCUMENTS 5,703,714 A * 12/1997 Kojima .................. G02B 21/06
250/201.3
6,088,537 A * 7/2000 Ohtaka ..................... G02B 7/28
396/81

(Continued)

FOREIGN PATENT DOCUMENTS

JP 2005-128334 A 5/2005
JP 2013-197965 A 9/2013

(Continued)

*Primary Examiner* — Chia Wei A Chen
(74) *Attorney, Agent, or Firm* — Canon USA Inc., IP Division

(57) ABSTRACT

An image capturing apparatus capable of interchanging a lens unit includes a processing unit configured to perform image correction processing based on data acquired by an acquisition unit. In the image capturing apparatus, the acquired data includes information of a first shooting condition, configured in a discrete manner, information of a plurality of second shooting conditions provided for each information of the first shooting condition, and correction information corresponding to a combination of the information of the first shooting condition and the information of the second shooting condition.

26 Claims, 15 Drawing Sheets

(56) References Cited

U.S. PATENT DOCUMENTS

| | | | | |
|---|---|---|---|---|
| 7,046,838 B1* | 5/2006 | Sakagawa | G01B 11/25 | 345/419 |
| 2002/0080242 A1* | 6/2002 | Takahashi | H04N 5/217 | 348/207.99 |
| 2004/0041936 A1* | 3/2004 | Uchiyama | H04N 5/2176 | 348/335 |
| 2006/0119732 A1* | 6/2006 | Ohta | H04N 5/232 | 348/347 |
| 2006/0147200 A1* | 7/2006 | Arimoto | G03B 17/14 | 396/529 |
| 2006/0158546 A1* | 7/2006 | Hirai | G02B 7/102 | 348/335 |
| 2008/0199170 A1* | 8/2008 | Shibuno | G02B 7/102 | 396/125 |
| 2009/0002526 A1* | 1/2009 | Koishi | H04N 5/23209 | 348/241 |
| 2009/0245778 A1* | 10/2009 | Shibuno | G02B 7/102 | 396/135 |
| 2009/0256950 A1* | 10/2009 | Kawazoe | G03B 13/36 | 348/345 |
| 2009/0303378 A1* | 12/2009 | Yoshimatsu | H04N 5/23212 | 348/348 |
| 2010/0053357 A1* | 3/2010 | Ikeda | G06T 5/005 | 348/222.1 |
| 2010/0110217 A1* | 5/2010 | Shibuno | H04N 5/23209 | 348/222.1 |
| 2010/0110277 A1* | 5/2010 | Shibuno | H04N 5/23209 | 348/360 |
| 2010/0208095 A1* | 8/2010 | Sugimori | G03B 17/14 | 348/222.1 |
| 2011/0043667 A1* | 2/2011 | Kotani | H04N 5/23216 | 348/241 |
| 2011/0050923 A1* | 3/2011 | Nomura | G03B 7/097 | 348/208.99 |
| 2011/0187815 A1* | 8/2011 | Asami | H04N 5/228 | 348/36 |
| 2012/0002113 A1* | 1/2012 | Nishio | H04N 9/045 | 348/624 |
| 2012/0008214 A1* | 1/2012 | Toyoda | G02B 13/0065 | 359/686 |
| 2012/0081594 A1* | 4/2012 | Makigaki | H04N 5/23209 | 348/340 |
| 2012/0133784 A1* | 5/2012 | Kajimura | H04N 5/225 | 348/207.99 |
| 2012/0257882 A1* | 10/2012 | Kikuchi | G03B 17/14 | 396/91 |
| 2012/0327293 A1* | 12/2012 | Ollila | G02B 7/36 | 348/362 |
| 2013/0028590 A1* | 1/2013 | Hasuda | G03B 17/14 | 396/530 |
| 2013/0235250 A1* | 9/2013 | Fainstain | H04N 5/23212 | 348/345 |

FOREIGN PATENT DOCUMENTS

| | | |
|---|---|---|
| JP | 2017-034720 A | 2/2017 |
| JP | 2017-034721 A | 2/2017 |
| TW | 201351014 A | 12/2013 |

\* cited by examiner

FIG.2

HEADER REGION

| FOCAL DISTANCE DIVISION POINT INFORMATION z[0] |
| FOCAL DISTANCE DIVISION POINT INFORMATION z[1] |
| FOCAL DISTANCE DIVISION POINT INFORMATION z[2] |
| FOCAL DISTANCE DIVISION POINT INFORMATION z[3] |
| DIAPHRAGM DIVISION POINT INFORMATION f[0] |
| DIAPHRAGM DIVISION POINT INFORMATION f[1] |
| DIAPHRAGM DIVISION POINT INFORMATION f[2] |
| DIAPHRAGM DIVISION POINT INFORMATION f[3] |
| SHOOTING DISTANCE DIVISION POINT INFORMATION d[0] |
| SHOOTING DISTANCE DIVISION POINT INFORMATION d[1] |
| SHOOTING DISTANCE DIVISION POINT INFORMATION d[2] |
| SHOOTING DISTANCE DIVISION POINT INFORMATION d[3] |

CORRECTION VALUE STORAGE REGION

| z[0] – f[0] – d[0] |
| z[0] – f[0] – d[1] |
| z[0] – f[0] – d[2] |
| z[0] – f[0] – d[3] |
| z[0] – f[1] – d[0] |
| z[0] – f[1] – d[1] |
| ⋮ |
| z[1] – f[0] – d[0] |
| z[1] – f[0] – d[1] |
| ⋮ |
| z[3] – f[3] – d[2] |
| z[3] – f[3] – d[3] |

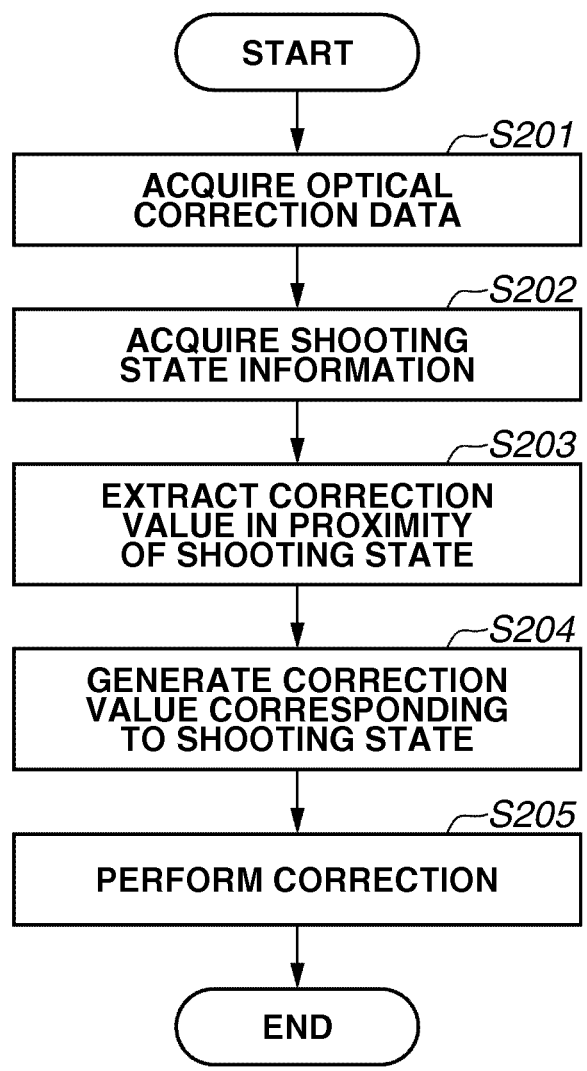

FIG.8

SHOOTING DISTANCE DIVISION POINT WITH
RESPECT TO FOCAL DISTANCE DIVISION POINT
(VALUE IS INVERSE NUMBER OF SHOOTING DISTANCE (cm))

|   | d0 | d1 | d2 | d3 |
|---|---|---|---|---|
| z0 | 0 | 0.015 | 0.030 | 0.037 |
| z1 | 0 | 0.014 | 0.028 | 0.034 |
| z2 | 0 | 0.010 | 0.020 | 0.025 |
| z3 | 0 | 0.016 | 0.032 | 0.040 |
| z4 | 0 | 0.013 | 0.027 | 0.033 |

FIG.15

| LENS ID | OPTICAL CORRECTION DATA FILE |
|---|---|
| 1 | 001.dat |
| 2 | 002.dat |
| 3 | 003.dat |
| 4 | 004.dat |
| 5 | 005.dat |

IMAGE CAPTURING APPARATUS

CROSS-REFERENCE TO RELATED APPLICATIONS

This application is a Continuation of co-pending U.S. patent application Ser. No. 14/385,977, filed Sep. 17, 2014, which is a U.S. national stage application of International Patent Application No. PCT/JP2013/001794 with international filing date Mar. 15, 2013, which claims foreign priority benefit of Japanese Patent Application No. 2012-063901 filed Mar. 21, 2012. All of the above-named patent applications are hereby incorporated by reference herein in their entirety.

TECHNICAL FIELD

The present invention relates to a technique for correcting image deterioration caused by the optical characteristics of a lens unit.

BACKGROUND ART

An image capturing apparatus such as a digital camera has been used in various purposes, and there is an increased demand to enhance quality of an image output from the image capturing apparatus. Image deterioration caused by the optical characteristics of an image capturing lens employed for forming an object image is one factor which hinders the image quality enhancement of the image. Marginal light attenuation, distortion aberration, and chromatic aberration of magnification can be given as examples of the optical characteristics which causes the image deterioration although these optical characteristics may vary depending on the optical system of a lens unit. The optical system from which the optical characteristics causing the image deterioration are completely eliminated has been difficult in recent years since miniaturization of the lens unit has been required. Therefore, there is provided a technique for correcting such deterioration in image quality by performing image processing.

It is very difficult to completely extract the optical characteristics of the lens from the image. Therefore, in order to perform such correction through image processing with high accuracy, optical correction data used for the above correction, which indicates the optical characteristics of an imaging optical system, is stored in a memory in the image capturing apparatus. In particular, in a single-lens reflex digital camera, the optical correction data for a plurality of lens units (imaging optical systems) that can be attached to that single-lens reflex digital camera has to be stored. In addition, even in the same imaging optical system, the optical characteristics may vary depending on the optical parameters such as a focal distance, a shooting distance, and a diaphragm value. Therefore, the optical correction data corresponding to a plurality of optical parameters is stored in a memory of the image capturing apparatus, so that a correction value conforming to shooting condition at the time of shooting is calculated from the optical correction data.

In Japanese Patent Application Laid-Open No. 2005-286482, the distortion aberration data serving as a discrete point on an image height-distortion aberration curve which indicates a relationship between the image height (a distance from a central position of the image) and the distortion aberration is held, and a correction value is calculated from an image height-distortion aberration approximate equation generated from the distortion aberration data.

As described above, the optical characteristics may vary depending on the optical parameters such as the focal distance, the shooting distance and the diaphragm value. There is also provided a method in which correction values corresponding to the entire optical parameters that can be acquired at the shooting time are stored as the optical correction data. However, with this method, the size of the optical correction data will be remarkably large, so that a large-capacity memory is required for the image capturing apparatus and a signal processing apparatus.

Further, with the conventional technique discussed in Japanese Patent Application Laid-Open No. 2005-286482, a problem relating to the size of the optical correction data and the correction accuracy, which arises when a shooting range varies according to the focal distance, has not been solved.

CITATION LIST

Patent Literature

[PTL 1]
Japanese Patent Application Laid-Open No. 2005-286482

SUMMARY OF INVENTION

Therefore, an advantage of some aspects of the present invention is to provide a technical idea for reducing the size of the optical correction data while maintaining high-accuracy correction.

According to an aspect of the present invention, an image capturing apparatus capable of interchanging a lens unit includes an acquisition unit configured to acquire data for image correction processing from the lens unit, and a processing unit configured to perform image correction processing based on the data acquired by the acquisition unit. In the image capturing apparatus, the acquired data includes information of a first shooting condition, configured in a discrete manner, information of a plurality of second shooting conditions provided for each information of the first shooting condition, and correction information corresponding to a combination of the information of the first shooting condition and the information of the second shooting condition.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 2 is a diagram illustrating an example of optical correction data.

FIG. 4 is a flowchart illustrating a flow of correction processing according to the first exemplary embodiment of the present invention.

FIG. 8 is a table illustrating a shooting distance division point according to the first exemplary embodiment of the present invention.

FIG. 15 is a diagram illustrating a table for identifying optical correction data according to the second exemplary embodiment of the present invention.

DESCRIPTION OF EMBODIMENTS

Various exemplary embodiments, features, and aspects of the invention will be described in detail below with reference to the drawings.

A first exemplary embodiment to which the present invention is applied will be described below.

(Example of Basic Configuration of Image Capturing Apparatus)

Figure 1:
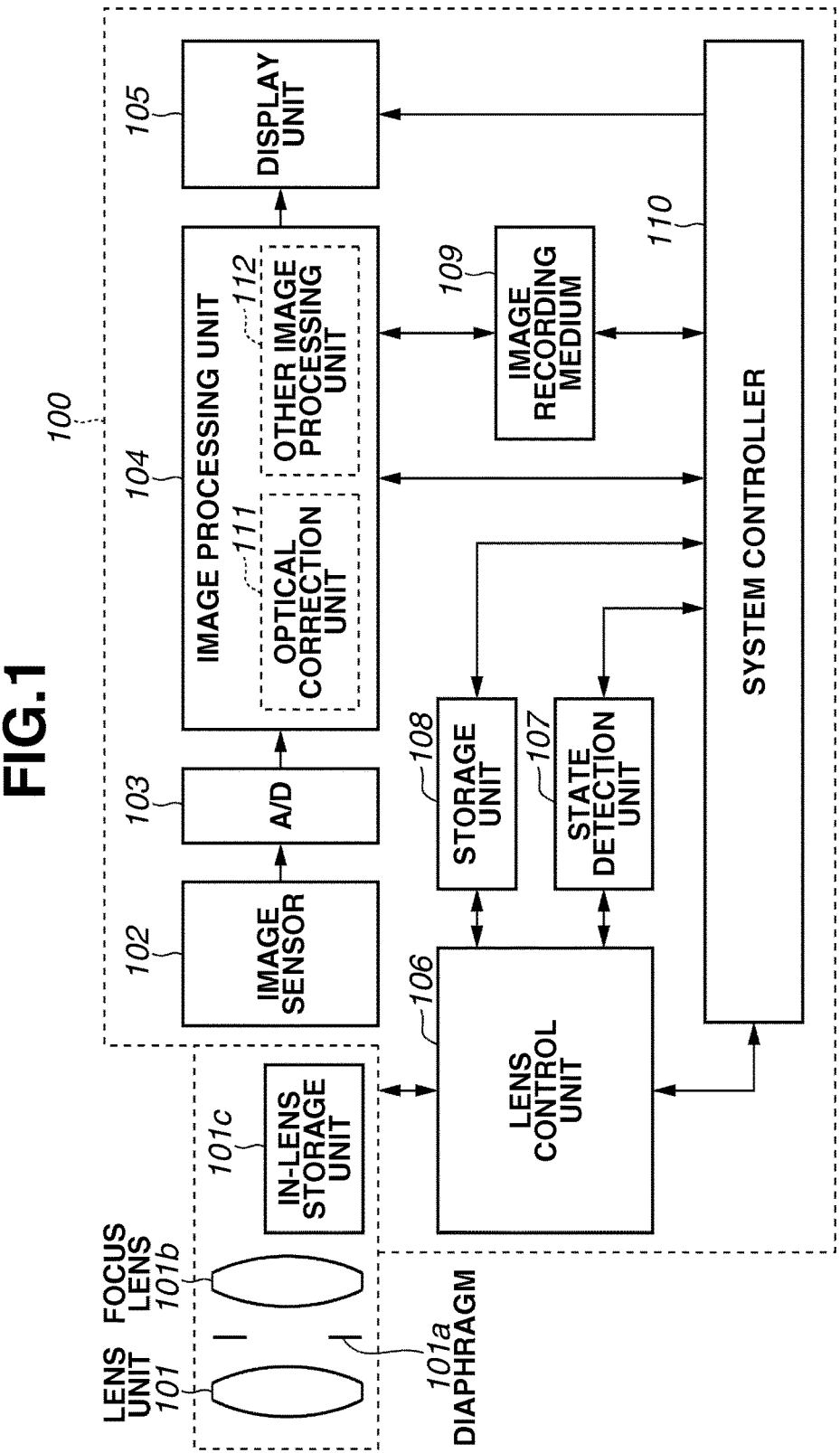
FIG. 1 is a block diagram illustrating a configuration of an image capturing apparatus according to a first exemplary embodiment of the present invention.
Figure 3A:
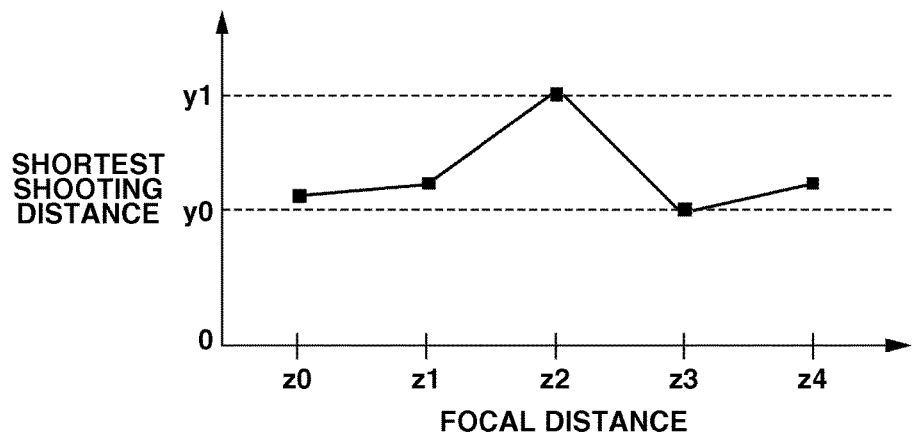
FIG. 3A is a graph illustrating an example of an optical characteristic with respect to a shooting distance.
Figure 3B:
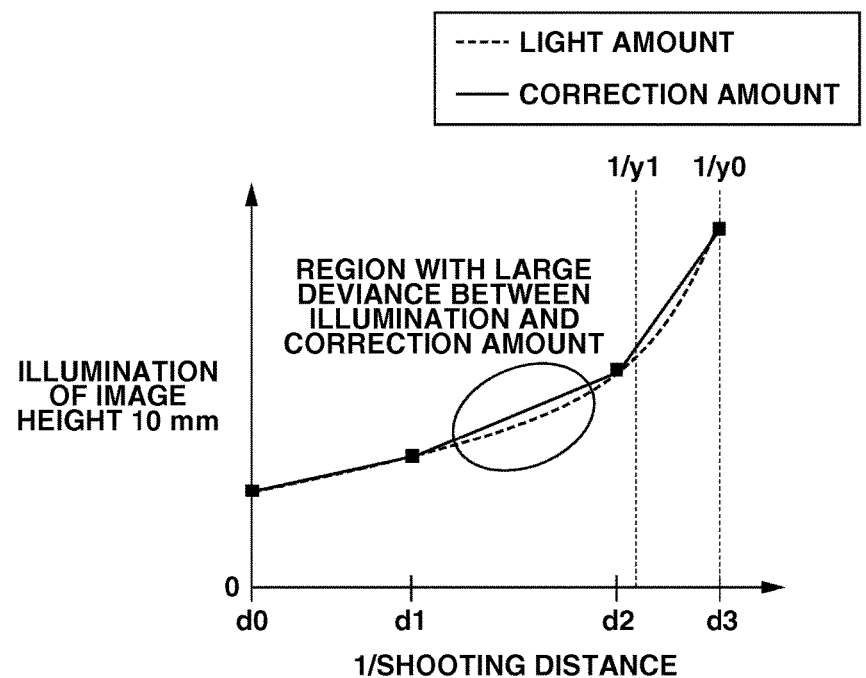
FIG. 3B is a graph illustrating an example of a correction value with respect to a shooting distance.

FIG. 1 is a block diagram illustrating a basic configuration of an image capturing apparatus according to the exemplary embodiment of the present invention. An image of an object (not illustrated) is formed on an image sensor 102 within a camera main unit 100 through an imaging optical system of a lens unit 101. An opening diameter of a diaphragm 101a is controlled as an F-number shooting state setting. In order to perform focus adjustment according to an object distance, a lens position of a focus lens 101b is controlled by an autofocus (AF) mechanism or a manually-operated manual focus mechanism, both of which are not illustrated therein. An in-lens unit storage unit 101c stores the optical correction data necessary to correct through image processing image deterioration caused by the optical characteristics.

In the image capturing apparatus, the lens unit 101 is detachable from the camera main unit 100 so as to be interchangeable with other imaging optical system. An image sensor 102 converts image-forming light into an electric signal. Then, an analog-digital (A/D) converter 103 converts that electric signal into a digital signal. Thereafter, the digital signal is input to an image processing unit 104. The image processing unit 104 is configured with an optical correction unit 111 and other image processing unit 112 that performs predetermined processing. The optical correction unit 111 corrects the image deterioration caused by the optical characteristics of the image capturing lens by performing image processing. Further, other image processing units 112 perform a series of development processing such as pixel interpolation processing, luminance signal processing, and color signal processing.

A lens unit control unit 106 controls the lens unit 101 and performs data communication. A state detection unit 107 acquires the shooting time information such as a focal distance, a shooting distance, and a diaphragm value of the imaging optical system, via the lens unit control unit 106. Further, the lens unit control unit 106 acquires the optical correction data stored in the in-lens unit storage unit 101c of the lens unit 101, and stores that optical correction data in a storage unit 108.

The optical correction unit 111 generates, from the optical correction data stored in the storage unit 108, a correction value corresponding to the shooting time information acquired by the state detection unit 107. This correction value is used to correct the image deterioration caused by the optical characteristics.

An output image that has been processed by the image processing unit 104 is stored in an image recording medium 109 in a predetermined format. An image on which a predetermined display processing has been performed after going through the optical correction processing, and an image on which the optical correction processing is not performed may be displayed on a display unit 105.

A system controller 110 performs a series of control processing, and the lens unit control unit 106 mechanically drives the lens unit 101 according to an instruction from the system controller 110.

(Optical Correction Processing)

Details of the optical correction processing will be described based on the flow of optical correction processing illustrated in FIG. 4 which is performed by the image capturing apparatus according to the present invention.

(Acquisition of Optical Correction Data)

In step S201, the system controller 110 acquires the optical correction data that is necessary to perform optical correction processing. As described above, this processing is controlled by the lens unit control unit 106, which transfers the optical correction data stored in the in-lens unit storage unit 101c to the storage unit 108 in the camera main unit 100. The optical correction data is transferred at the timing at which a camera is activated and the timing at which the lens unit 101 is attached to the camera main unit 100. Further, the optical correction data is stored in the storage unit 108 when the correction processing is executed.

Figure 5:
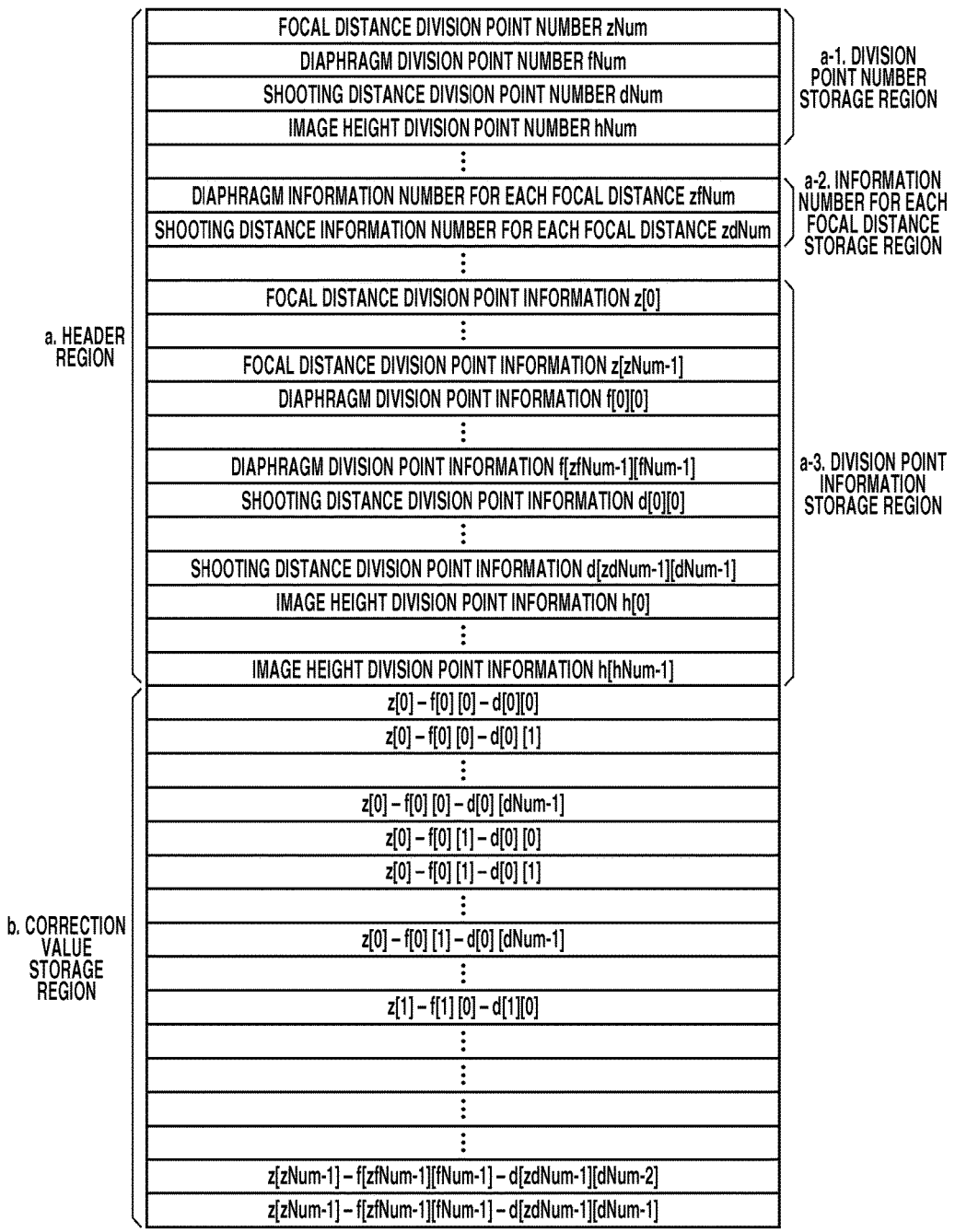
FIG. 5 is a diagram illustrating optical correction data according to the first exemplary embodiment of the present invention.

A configuration of the optical correction data transferred to the storage unit 108 from the in-lens unit storage unit 101c is illustrated in FIG. 5. The optical correction data is configured of two regions, a header region (a) and a correction value storage region (b).

(Header Region (a))

The header region (a) includes a division point number storage region (a-1), an information number storage region (a-2) for each focal distance, and a division point information storage region (a-3).

Instead of causing the optical correction data to store the correction value corresponding to all optical parameters such as the focal distance, the shooting distance, and the diagram value acquired at the shooting time, the correction information according to a target optical parameter is stored as the optical correction data by dividing and discretely selecting each optical parameter. The information relating to the target optical parameter is stored in the division point information storage region (a-3), and the correction value corresponding to that optical parameter is stored in a correction value storage region (b).

The division point number storage region (a-1) is a region for recording a point number in which each parameter is stored discretely.

Figure 6:
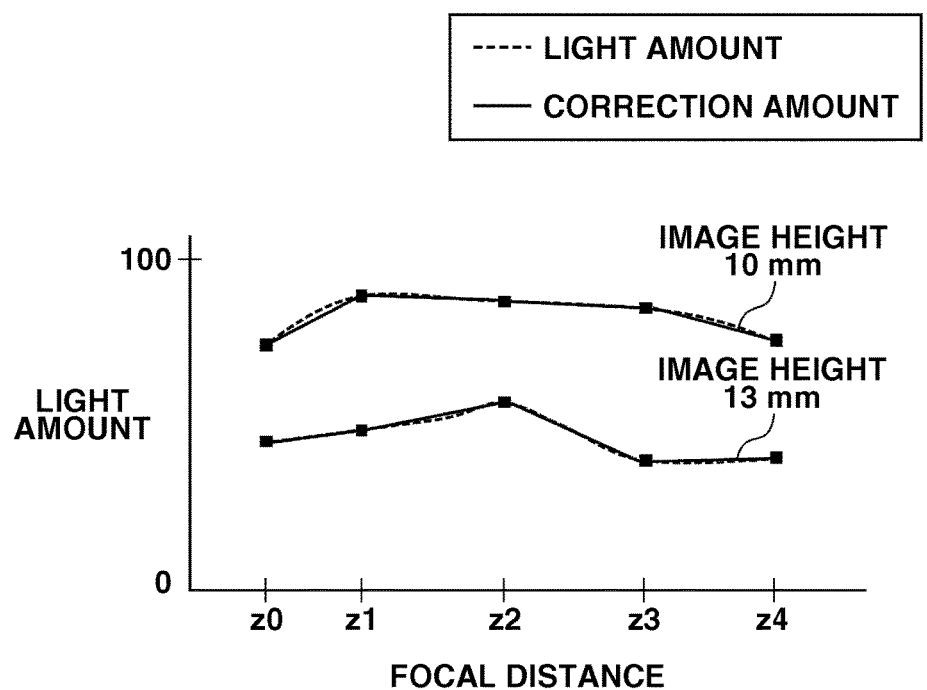
FIG. 6 is a graph illustrating examples of the optical characteristic and the correction value with respect to a focal distance according to the first exemplary embodiment of the present invention.

A graph in FIG. 6 illustrates examples of variability characteristics of marginal illumination according to the focal distance for the image height portions 10 mm and 13 mm, and further illustrates examples of correction values (division points) stored in the optical correction data. In FIG. 6, a dotted line indicates illumination as an optical characteristic, a plot indicates a point in the optical correction data where a correction value is held, and a solid line indicates a result acquired by linearly interpolating the correction value. The illumination value illustrated in FIG. 6 is a value in which the illumination of the central portion of the image is taken as 100. In this example, in order to follow up the variation in marginal illumination according to the focal distance, the focal distance for the correction value held in the optical correction data is set to be five points, z0 through z4. Therefore, "5" is stored in a focal distance division point number zNum of the division point storage region (a-1). As described above, in order to follow up the variation in the optical characteristic with respect to the optical parameter, a division point is set according to the optical characteristic, and a region for storing that division point number is provided in the header region of the optical correction data. Thus, the minimum number of division point numbers can be set in consideration of the correction accuracy required for the image capturing apparatus.

The division point number has been described by taking the focal distance as an example. The description thereof is also applicable to cases where the shooting distance and the diaphragm are taken, and thus the division point number according to the optical characteristic of each optical parameter can be set thereto. In FIG. 5, the division point number of the shooting distance is stored in a shooting distance division point number dNum whereas the division point number of the diaphragm is stored in a diaphragm division point number fNum.

(Example of Variation in Shortest Shooting Distance at Each Focal Distance Division Position)

Figure 7A:
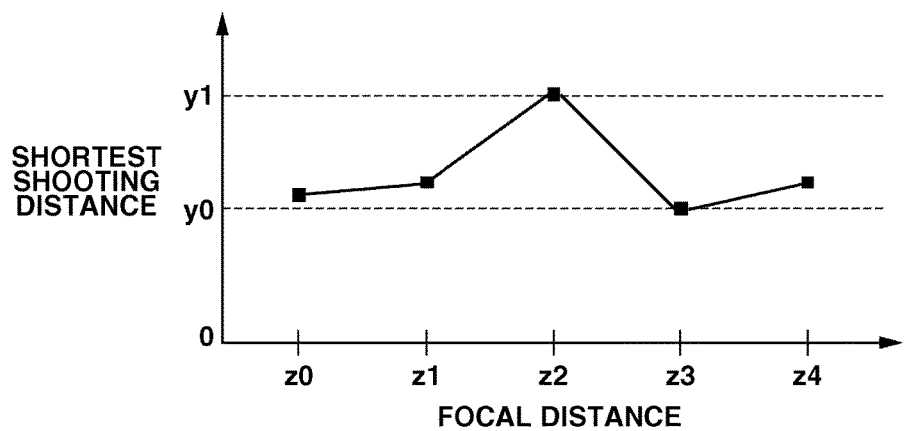
FIG. 7A is a graph illustrating the optical characteristic with respect to a shooting distance according to the first exemplary embodiment of the present invention.

FIG. 7A is a graph illustrating an example of variation in the shortest shooting distance at each focal distance division position. The shortest shooting distance described below indicates a minimum value of the object distance where the object image can be captured. In this example, the shortest shooting distance becomes the maximum value y1 at the focal distance z2, and the shortest shooting distance becomes the minimum value y0 at the focal distance z3. In a case where the shortest shooting distance varies according to the focal distance as described above, the shooting distance division point is set according to the focal distance division point. FIG. 8 is a table illustrating examples of the shooting distance values when the focal distance division points z0 through z4 respectively store the shooting distance division points.

Each value is an inverse number of the shooting distance (cm) while "0" indicates infinity. In a case where the division point information illustrated in FIG. 8 is stored in the optical correction data, "5" is stored in a shooting distance information number zdNum for each focal distance, of the information number storage region (a-2) for each focal distance whereas the information of the shooting distance division point according to the focal distance is stored in the shooting distance division point information d[0][0] through d[zdNum−1][dNum−1] of the division point information storage region (a-3) in FIG. 5.

(Inverse Number of Shooting Distance and Illumination Characteristic at Image Height Portion)

Figure 7B:
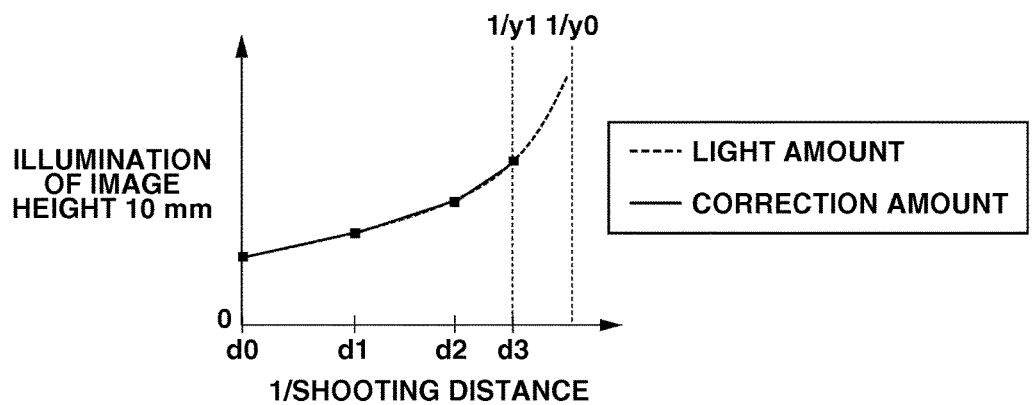
FIG. 7B is a graph illustrating the correction value with respect to a shooting distance according to the first exemplary embodiment of the present invention.

A graph in FIG. 7B illustrates the inverse number of the shooting distance and the illumination characteristic at the image height position 10 mm for the focal distance z2 illustrated in FIG. 7A, and further illustrates an example of the division point stored in the optical correction data. By limiting a range of the shooting distance region which stores the correction value to a range in which the image can be practically captured, the graph illustrates the state where the correction value follows the illumination characteristic according to the shooting distance with high accuracy. As described above, in a case where the shortest shooting distance varies according to the focal distance, the optical correction data can store a correction value that follows the optical characteristic by setting the division point of the shooting distance at each focal distance. However, in a case where the variation in the shortest shooting distance according to the focal distance is small, or in a case where the influence of the variation in the shortest shooting distance can be ignored, it is not necessary to set the division point of the shooting distance at each focal distance. In such a case, "1" is stored in the shooting distance information number zdNum for each focal distance while the shooting distance division point information is only stored in d[0][0] through d[0][dNum−1]. Accordingly, the size of the optical correction data can be further reduced.

As described above, the shooting distance division point is set for each focal distance. Likewise, the diaphragm division point can be also set for each focal distance. In this case, the diaphragm information number zfNum for each focal distance and the diaphragm division point information f[0][0] through f[zfNum−1][fNum−1] are employed.

(Other Division Point Number)

Figure 7C:
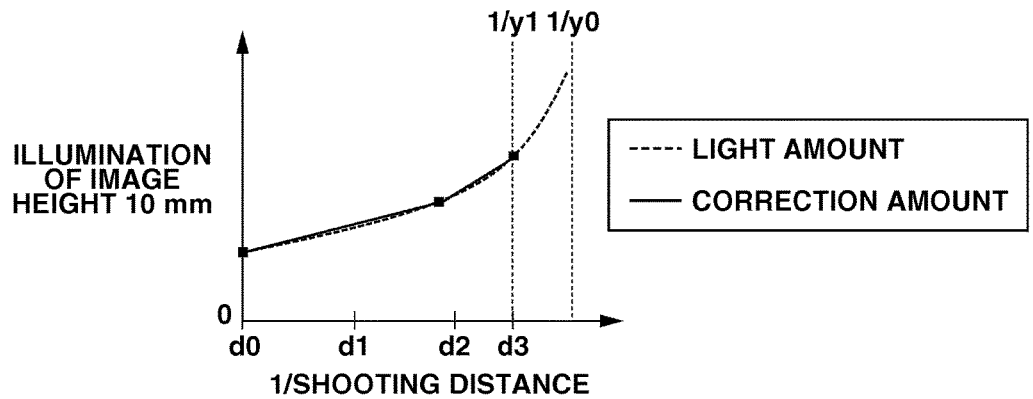
FIG. 7C is a graph illustrating the correction value with respect to a shooting distance according to the first exemplary embodiment of the present invention.

FIG. 7C is a graph illustrating an example in which the division point number of the shooting distance is set to "3" instead of "4". Accordingly, while the follow up accuracy of the correction value with respect to the optical characteristics is taken into consideration, the size of the optical correction data can be reduced by reducing the division point within the required correction accuracy. In this case, "3" is stored in the shooting distance division point number dNum.

(Correction Value Storage Region (b))

Figure 9:
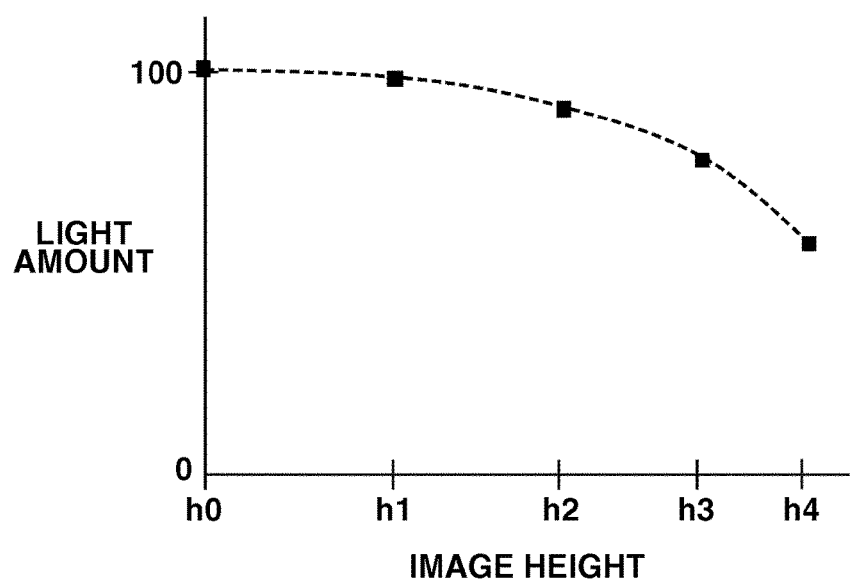
FIG. 9 is a graph illustrating the correction value according to the first exemplary embodiment of the present invention.

Next, the correction value storage region (b) will be described. The correction value corresponding to each combination of the optical parameters stored in the division point information storage region (a-3) is stored in the correction value storage region (b) as the correction information. FIG. 9 is a graph illustrating an example of the correction value with respect to marginal light attenuation. A dotted line indicates a characteristic of illumination with respect to the image height, and a plot indicates a position in which the illumination value with respect to a discrete image height is stored as a correction value. This information relating to the discrete image height is stored in such a manner that the division point number is stored in the image height division point number hNum of the division point number storage region (a-1) whereas the image height values are stored in the image height division point information h[0] through h[hNum−1] of the division point information storage region (a-3). By making the above set of the image height-correction value illustrated in FIG. 9 as one correction value with respect to the combination of the optical parameters, the correction value storage region (b) stores this correction value with respect to all combinations of the division points of the optical parameters stored in the division point information storage region (a-3). In other words, 60 pieces (5×3×4) of correction values are stored therein if the focal distance division point zNum is 5, the shooting distance division point number dNum is 3, and the diaphragm division point number fNum is 4.

Storage order of each correction value in the correction value storage region (b) needs to be set in advance. For example, as illustrated in FIG. 5, priority order is determined to be the focal distance, the diaphragm, the shooting distance, and thus each parameter value is stored in ascending order. As described above, by setting the storage order of the correction value in advance, a location where the target correction value is recorded can be identified based on each information in the division point number storage region (a-1), the information number for each focal distance storage region (a-2), and the division point information storage region (a-3), stored in the header region (a).

(Distortion Aberration and Chromatic Aberration of Magnification)

The correction value with respect to the marginal light attenuation has been described above. The optical correction data in a same format can also be applied to distortion aberration and chromatic aberration of magnification. In the example of the correction value illustrated in FIG. 9, the vertical axis represents a distortion amount in a case of the correction value with respect to the distortion aberration. On the other hand, the vertical axis can be regarded as a chromatic aberration amount in a case of the correction value with respect to the chromatic aberration of magnification.

The optical correction data according to the present invention has been described above. The optical correction data is configured such that the division point number can be set for each optical parameter, while the division points of the shooting distance and the diaphragm can be set according to the focal distance. In such a configuration, the optical correction data with high-accuracy and with a size reduced to a requisite minimum according to the optical characteristics of the lens unit can be realized.

Comparison Example

As a method of reducing the size of the optical correction data, the correction value according to the selected optical parameter can be stored as the optical correction data by discretely selecting each optical parameter instead of storing the correction value of all optical parameters. FIG. 2 is a diagram illustrating an example of how the correction value is stored in the optical correction data. In the example, a focal distance from a wide-angle end through a tele-angle end is discretely stored by dividing it into four points, z[0] through z[3], so that z[0] indicates the wide-angle end of the focal distance whereas z[3] indicates the tele-angle end thereof. Similarly, the diaphragm is divided into four points, f[0] through f[3], and the shooting distance are divided into four points, d[0] through [d3] to be discretely stored. As illustrated in FIG. 2, correction values corresponding to the combinations of parameters defined in the header region are sequentially stored in a correction value storage region of the optical correction data. Then, the correction value conforming to the actual shooting condition is generated based on the discrete correction value stored in the correction value storage region.

In this way, the size of the correction data can be reduced by storing the correction value discretely. However, because the correction value is stored discretely, there may be a case where the correction accuracy is lowered, and the correction cannot be performed correctly. FIG. 6 is a graph illustrating the examples of variability characteristics of the marginal illumination according to the focal distance for the image height portions 10 mm and 13 mm. A dotted line indicates illumination as an optical characteristic, a plot indicates a point in the optical correction data where a correction value is stored, and a solid line indicates a result acquired by linearly interpolating the correction value. The illumination value illustrated in FIG. 6 is a value in which the illumination of the central portion of the image is taken as 100. The focal distance of the correction value stored in the optical correction data is set to be four points, z0 through z3. As illustrated in FIG. 6, the variability characteristics of the illumination with respect to the focal distance indicated by the dotted lines differ significantly between the image height portions 10 mm and 13 mm. Therefore, the correction value generated from the four points, z0 through z3, includes an area which is considerably different from the actual illumination. In the example illustrated in FIG. 6, the correction value of the focal distance between z0 and z1 is less than the actual illumination in the image height portion 10 mm. In this case, the correction is performed based on the illumination less than the actual illumination, and thus, the correction result thereof will be overcorrection.

On the other hand, in the focal distance between z1 and z2 overcorrection appears at the image height portion 13 mm. FIGS. 7B and 7C are graphs illustrating the examples in which the division positions z0 through z3 of the focal distance are changed respectively. By changing the division positions, the correction accuracy may be improved in one region of the focal distance region. However, the accuracy may be lowered in other regions. In the example illustrated above, linear interpolation is performed to generate correction values between the correction values that are stored discretely. Thus, even if other interpolation method using an approximate polynomial is employed, the correction accuracy is similarly lowered if the optical characteristic is significantly different in each focal distance.

The correction accuracy can be improved by increasing the division point number of the optical parameter which is stored discretely. However, the relationship between the correction accuracy and the data size shows a so-called "trade-off" relationship. As described above, the method is particularly beneficial to a single-lens reflex camera in terms of the hardware resources. This is because, with the method, the optical correction data for a plurality of lens units (imaging optical systems) that is attachable to the camera can be stored while the size of the optical correction data for one lens unit can be reduced.

(Acquisition of Shooting State Information)

Next, as illustrated in FIG. 4, after the acquisition of the optical correction data in step S201, in step S202, the system controller 110 acquires shooting state information. The system controller 110 causes the state detection unit 107 to acquire the information such as a focal distance Z, a shooting distance D, and a diaphragm F at the shooting time, each of which serves as an optical parameter necessary to perform the optical correction.

(Generation of Correction Value)

Then, in step S203, in order to generate the correction value corresponding to the focal distance Z, the shooting distance D, and the diaphragm D serving as the optical parameters at the shooting time, the system controller 110 extracts, from the correction values stored in the optical correction data, a correction value in the proximity of the optical parameter at the shooting time. Specifically, from among the division point information z[ ], d[ ], f[ ] of each of the optical parameters stored in the optical correction data, the system controller 110 respectively detects "nz", "nd", and "nf" which satisfy the following conditions.

$$z[nz] <= Z < z[nz+1] \quad \text{Equation 1}$$

("nz" is "zNum−2" if Z>=z[zNum−1])

$$d[nd] <= 1/D < d[nd+1] \quad \text{Equation 2}$$

("nd" is "dNum−2" if 1/D>=d[dNum−1])

$$f[nf] <= F < f[nf+1] \quad \text{Equation 3}$$

("nf" is "fNum−2" if F>=f[fNum−1])

Then, the system controller 110 extracts the following eight patterns of correction values "Ps" configured of "nz", "nd", and "nf" from the correction value storage region (b) of the optical correction data.

P[0][0][0]: a correction value corresponding to (z[nz], d[nd], f[nf])
P[0][0][1]: a correction value corresponding to (z[nz], d[nd], f[nf+1])
P[0][1][0]: a correction value corresponding to (z[nz], d[nd+1], f[nf])
P[0][1][1]: a correction value corresponding to (z[nz], d[nd+1], f[nf+1])
P[1][0][0]: a correction value corresponding to (z[nz+1], d[nd], f[nf])
P[1][0][1]: a correction value corresponding to (z[nz+1], d[nd], f[nf+1])
P[1][1][0]: a correction value corresponding to (z[nz+1], d[nd+1], f[nf])
P[1][1][1]: a correction value corresponding to (z[nz+1], d[nd+1], f[nf+1])

Next, in step S204, the system controller 110 generates a correction value corresponding to the shooting state at the shooting time from the above extracted eight correction values.

Figure 10:
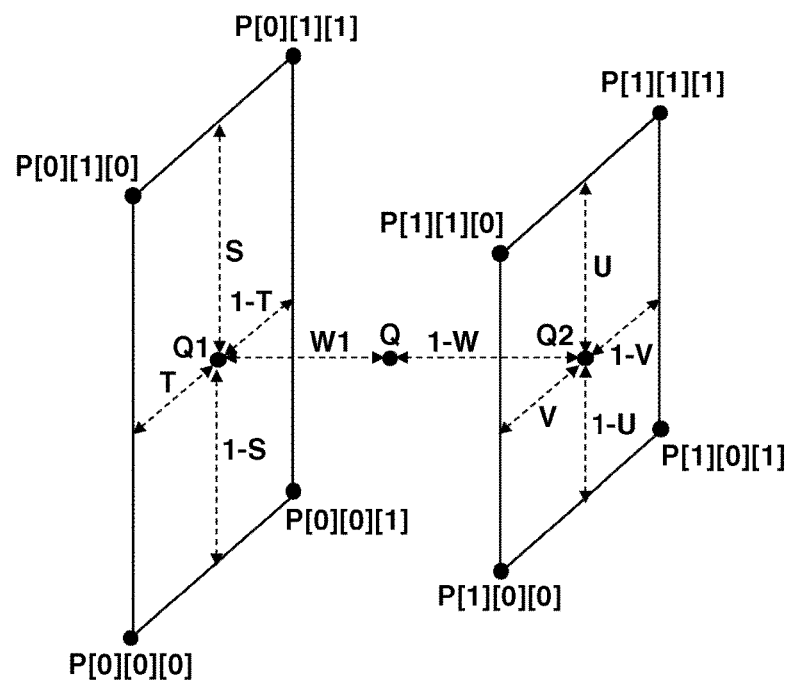
FIG. 10 is a diagram illustrating a calculation method of the correction value according to the first exemplary embodiment of the present invention.

The correction value generation method is executed by interpolating the above eight correction values. FIG. 10 is a schematic diagram illustrating one example of the method. The eight correction values "Ps" and a correction value "Q" that is to be generated are indicated in a three-dimensional space configured of a focal distance, a shooting distance, and a diaphragm. In order to generate the correction value "Q", a correction value "Q1" corresponding to the shooting distance "D" and the diaphragm "F" at the shooting time at the focal distance division point z[nz] is generated as follows.

$$Q1 = P[0][0][0] \times S \times (1 - T) + P[0][0][1] \times S \times T + \quad \text{Equation 4}$$
$$P[0][1][0] \times (1 - S) \times (1 - T) + P[0][1][1] \times (1 - S) \times T$$

As illustrated in FIG. 10, "S" and "T" in the above equation 4 represent weight coefficients according to a positional relationship of each of the correction values "Ps" with respect to the correction value "Q1".

Next, a correction value "Q2" corresponding to the shooting distance "D" and the diaphragm "F" at the shooting time at the focal distance division point z[nz+1] is generated as follows.

$$Q2 = P[1][0][0] \times U \times (1 - V) + P[1][0][1] \times U \times V + \quad \text{Equation 5}$$
$$P[1][1][0] \times (1 - U) \times (1 - V) + P[1][1][1] \times (1 - U) \times V$$

As illustrated in FIG. 10, "U" and "V" in the above equation 5 represent weight coefficients according to a positional relationship of each of the correction values "Ps" with respect to the correction value "Q2".

Thereafter, the target correction value "Q" is generated by interpolating the correction values "Q1" and "Q2" as follows.

$$Q = Q1 \times (1 - W) + Q2 \times W \quad \text{Equation 6}$$

Figure 11A:
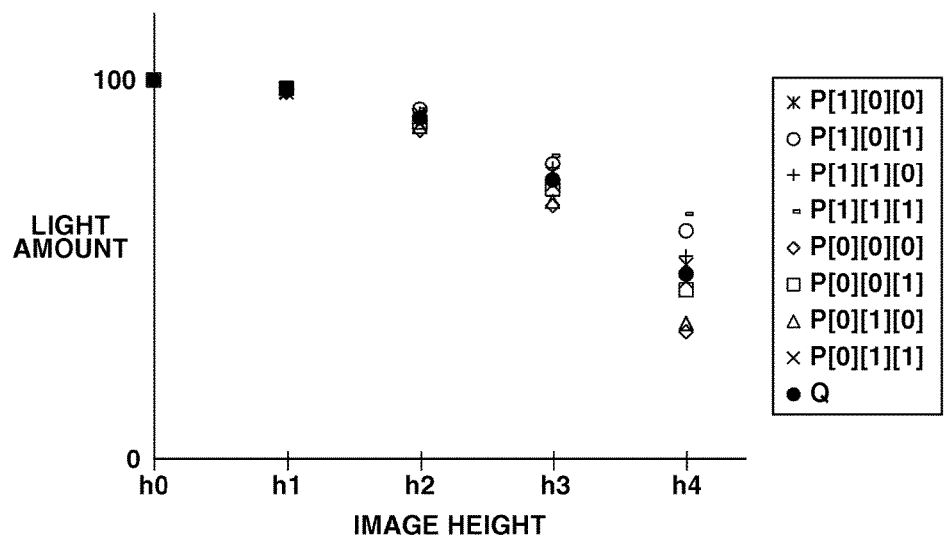
FIG. 11A is a graph illustrating a generated correction value according to the first exemplary embodiment of the present invention.

Through this, the correction value at the shooting time can be generated from the correction value in the proximity of the optical parameters at the shooting time. In addition, as described above, the correction value is a set of a plurality of image heights h0 through h4 and correction values with respect to each image height as illustrated in FIG. 9. Therefore, the above calculation is performed at each of the image heights h0 through h4. A relationship between the correction value "P" in the proximity of the optical parameter and the generated correction value "Q" at the shooting time at each image height is illustrated in a graph of FIG. 11A.

Optical Correction

Figure 11B:
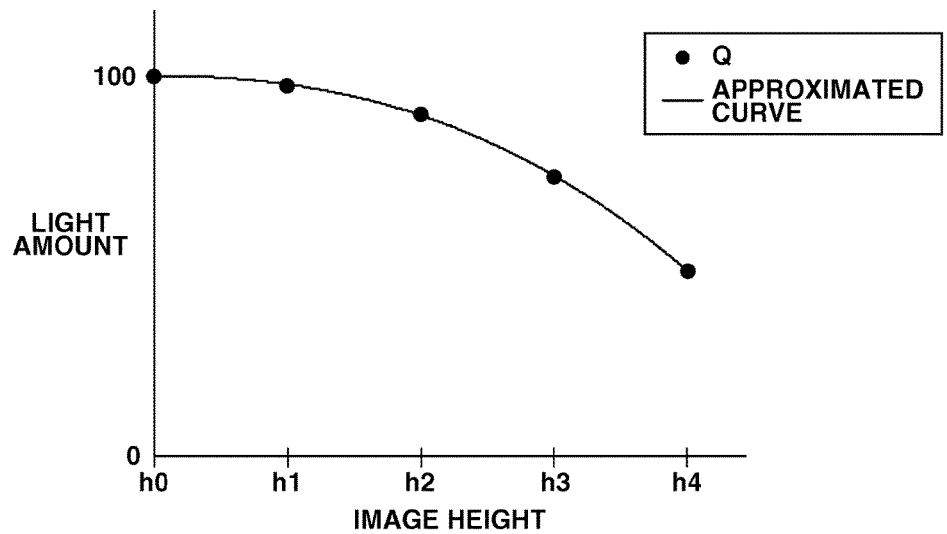
FIG. 11B is a graph illustrating a generated correction value according to the first exemplary embodiment of the present invention.

Next, in step S205, the system controller 110 performs optical correction based on the generated correction value serving as the correction information at the shooting time. As illustrated in FIG. 11B, the generated correction value is a discrete correction amount at each of the image heights h0 through h4. Therefore, a correction curve relative to the image height can be acquired by approximating the correction amount by a polynomial equation.

Figure 12A:
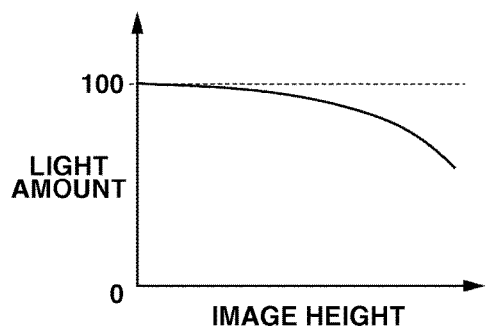
FIG. 12A is a graph illustrating correction results according to the first exemplary embodiment of the present invention.
Figure 12B:
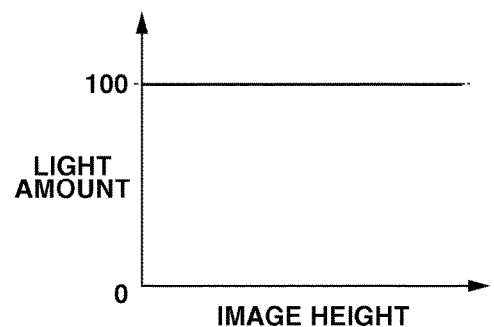
FIG. 12B is a graph illustrating correction results according to the first exemplary embodiment of the present invention.
Figure 12C:
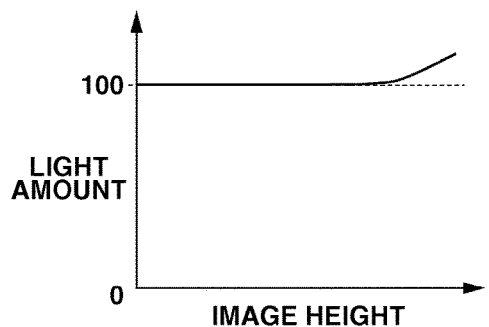
FIG. 12C is a graph illustrating correction results according to the first exemplary embodiment of the present invention.
Figure 12D:
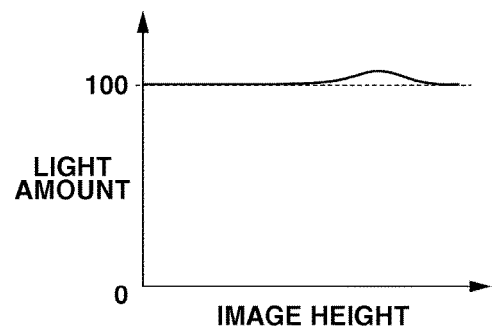
FIG. 12D is a graph illustrating correction results according to the first exemplary embodiment of the present invention.
Figure 12E:
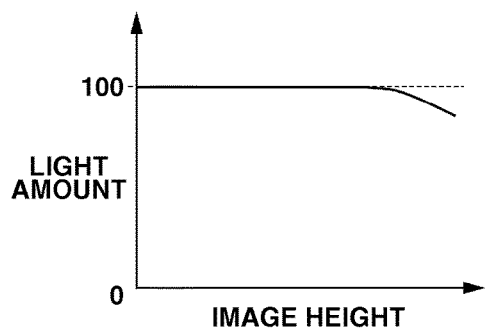
FIG. 12E is a graph illustrating correction results according to the first exemplary embodiment of the present invention.
Figure 12F:
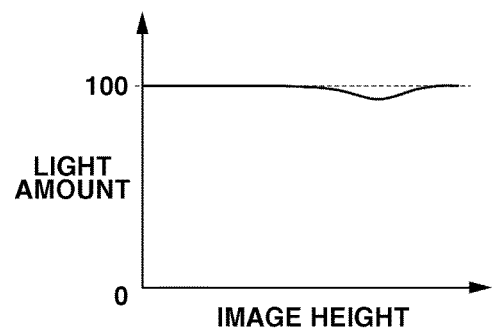
FIG. 12F is a graph illustrating correction results according to the first exemplary embodiment of the present invention.

A correction method through image processing will be described by taking the marginal light attenuation as an example. First, an image height, a distance from a central position of the image, is acquired for a correction target pixel, and illumination of a target image height is acquired from a generated correction curve. Next, an inverse number of the illumination is acquired, and gain according to the acquired inverse number is applied to a pixel value thereof. By performing the above processing on the entire pixels in the image, the marginal light attenuation can be corrected. FIGS. 12A through 12F are graphs illustrating the effect of the marginal light attenuation correction according to the present invention. Each of the graphs in FIGS. 12A through 12F illustrates an image height and brightness of an object image at the shooting time when the object with uniform luminance is captured while the brightness at the center of the image is 100. FIG. 12A illustrates a state in which the marginal light attenuation is generated due to the characteristics of the optical system. When the image processing is performed on an image, if the division point number of the optical correction data is not sufficient and cannot follow the optical characteristics in an appropriate manner, over-correction or under-correction of a part of the image as illustrated in FIGS. 12C through 12F may occur, and thus, this may result in an image with unnatural brightness that is different from the original brightness of the object. On the contrary, as illustrated in FIG. 12B, when the correction is performed by the image capturing apparatus according to the present invention, brightness of the image becomes approximately 100 in the entire image height, and thus the image corrected with high accuracy can be acquired.

The correction method of the marginal light attenuation has been described as the above. Although detailed descriptions of the image processing for the correction of distortion aberration and chromatic aberration of magnification will be omitted, a general flow is similar to the above-described, in which the correction is performed by acquiring the correction curve with respect to the image height.

In this manner, with the image capturing apparatus according to the present invention, the correction can be performed with high accuracy while reducing the size of the optical correction data to a requisite minimum. By reducing the size of the optical correction data, a memory capacity for storing the optical correction data in the camera can be reduced. In addition, when the optical correction data is transferred from the lens unit to the camera, the transfer time can be reduced.

Although the exemplary embodiments relating to the image capturing apparatus according to the present invention have been described above, many variations and modifications of the image capturing apparatus according to the present invention are possible without departing from the essential spirit of the invention.

A second exemplary embodiment to which the present invention is applied will be described below.

The present exemplary embodiment relates to an image processing apparatus configured to perform correction on an image captured by an image capturing apparatus to correct image deterioration caused by the optical characteristics of an optical system employed to capture the image.

Figure 13:
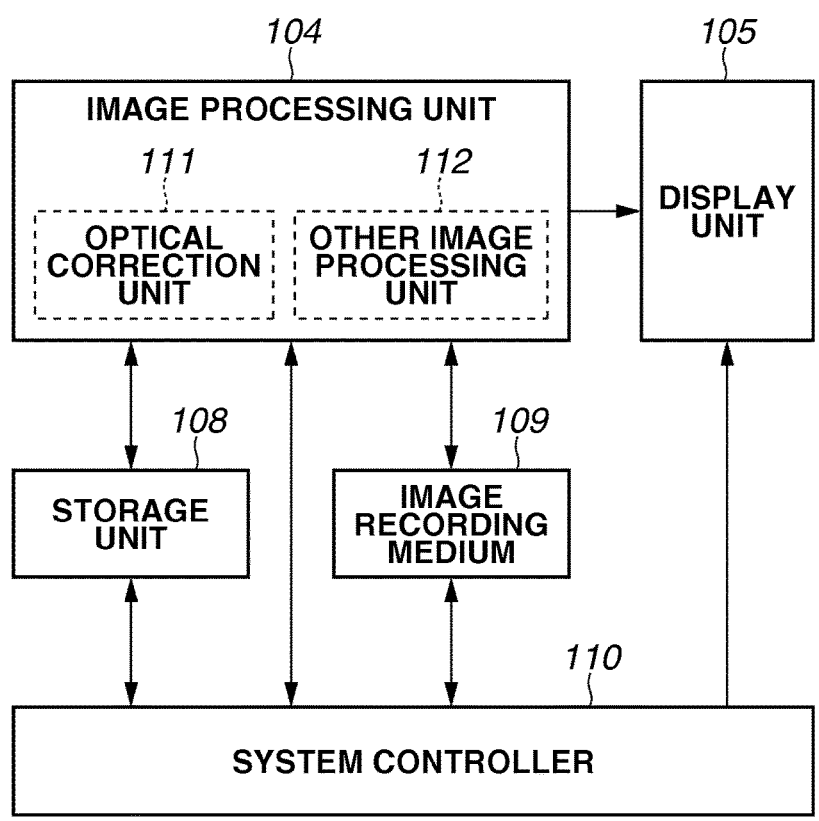
FIG. 13 is a block diagram illustrating a configuration of an image processing apparatus according to a second exemplary embodiment of the present invention.

FIG. 13 is a block diagram schematically illustrating the image processing apparatus according to the present exemplary embodiment.

An image captured by the image capturing apparatus is stored in an image recording medium 109. An image processing unit 104 is configured of an optical correction unit 111 and other image processing unit 112 that performs predetermined processing. The image processing unit 104 performs image processing with respect to an image stored in the image recording medium 109. The optical correction unit 111 corrects the image deterioration caused by the optical characteristics of the image capturing lens by performing image processing. Further, the other image processing unit 112 performs a series of image processing such as pixel interpolation processing, luminance signal processing, and color signal processing.

The optical correction data for correcting the image deterioration caused by the optical characteristics is stored in a storage unit 108. In the image processing apparatus, images captured by a plurality of optical systems will be the correction targets. Therefore, the optical correction data for the plurality of optical systems is stored in the storage unit 108 in a file format.

The output image processed by the image processing unit 104 is stored in the image recording medium 109 in a predetermined format. Further, the image processed by the image processing unit 104 is displayed on a display unit 105.

A system controller 110 performs a series of control processing.

Figure 14:
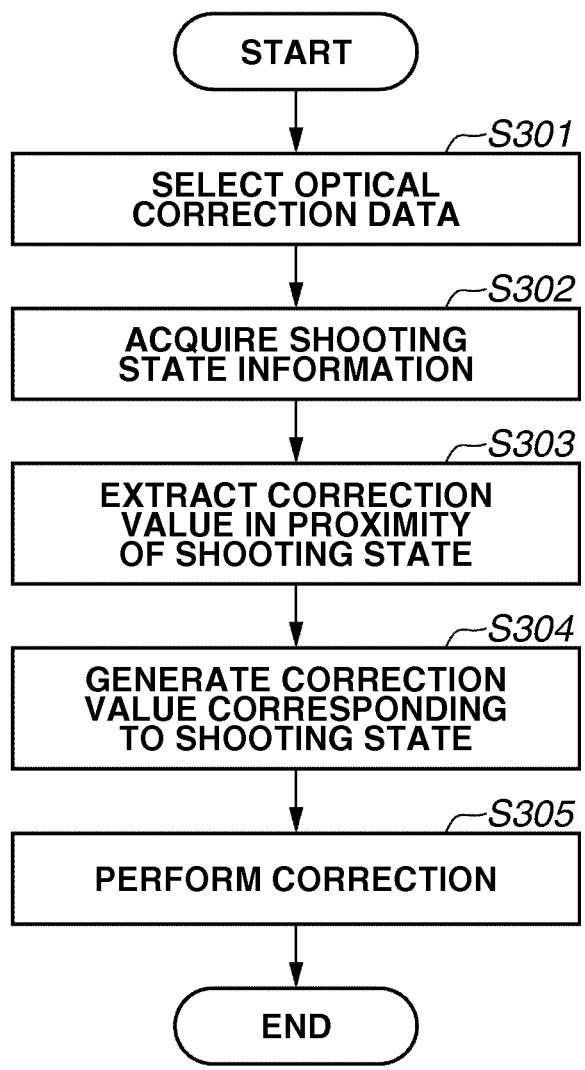
FIG. 14 is a flowchart illustrating a flow of correction processing according to the second exemplary embodiment of the present invention.

Details of the optical correction processing according to the present invention will be described based on the flow of optical correction processing illustrated in FIG. 14 performed by the image capturing apparatus according to the present invention.

In step S301, the system controller 110 selects the optical correction data necessary to perform the optical correction processing. The system controller 110 selects the optical correction data of the lens with which the correction target image is captured from among the optical correction data about a plurality of lenses stored in the storage unit 108. Therefore, the storage unit 108 of the image processing apparatus also stores an optical correction data reference table illustrated in FIG. 15. According to the table, the optical correction data of the lens to be used for the correction target image can be identified. A configuration of the optical correction data for each lens is the same as that of the optical correction data illustrated in the first exemplary embodiment.

Next, in step S302, the system controller 110 acquires shooting state information such as a focal distance, a shooting distance, and a diaphragm at the shooting time when the correction target image is captured. In a case where the information is stored in an image file at the time of capturing the image, the system controller 110 acquires the information by reading the information therefrom. In a case where the information is not stored in the image file, the system controller 110 acquires the information by causing a user to input the information through an input unit (not illustrated).

The same processing performed in steps S203, S204, and S205 in the first exemplary embodiment will be performed respectively in step S303 (extracting a correction value in the proximity of a shooting state), step S304 (generating a correction value corresponding to a shooting state), and step S305 (performing correction).

As described above, by making the optical correction data in the image processing apparatus have the same format as that in the first exemplary embodiment, the size of the optical correction data can be reduced, and the correction with high accuracy can be performed. Specifically, by employing the data structure capable of setting the division point number for each optical parameter, further capable of setting the division points of the shooting distance and the diaphragm according to the focal distance, the optical correction data with high-accuracy whose size is reduced to a requisite minimum according to the optical characteristics can be realized. By reducing the size of the data to a requisite minimum, a memory capacity required for the storage unit 108 of the image processing apparatus can be reduced. In addition, by using the same optical correction data as that in the image capturing apparatus according to the first exemplary embodiment, the image processing apparatus whose correction result can completely conform to that of the image capturing apparatus can be realized.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) (Trademark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

The invention claimed is:

1. An image capturing apparatus to which an interchangeable lens apparatus is attachable, the image capturing apparatus comprising:
one or more processors configured to
acquire data from the interchangeable lens apparatus and to perform image correction processing based on the data acquired from the interchangeable lens apparatus;
wherein a data structure of the data acquired by the one or more processors includes:
a first region that stores first information indicating a number of first shooting condition values and second information indicating a number of second shooting condition values in a set of the second shooting condition values;
a second region that stores third information indicating a number of sets of the second shooting condition values;
a third region that stores the first shooting condition values and the sets of the second shooting condition values, a number of the first shooting condition values is indicated by the first information and a number of the sets of the second shooting condition values is indicated by the third information, and each set of the second shooting condition values consisting of the second shooting condition values whose number is indicated by the second information, and each set of the second shooting condition values consisting of the second shooting condition values whose number is indicated by the second information; and
a fourth region that stores correction values according to a combination of the first shooting condition values and the second shooting condition values.

2. The image capturing apparatus according to claim 1, wherein when the number indicated by the third information is larger than one, each of the sets stored in the third region corresponds to a different one of the first shooting condition values.

3. The image capturing apparatus according to claim 1, wherein when the number indicated by the third information is equal to one, a set of the second shooting condition values corresponds to each of the first shooting condition values.

4. The image capturing apparatus according to claim 1, wherein the one or more processors performs the image correction processing using the correction values stored in the fourth region, according to a first shooting condition value and a second shooting condition value at the time of capturing an image.

5. The image capturing apparatus according to claim 1, wherein the one or more processors acquires a first shooting condition value and a second shooting condition value at the time of capturing an image, from the lens apparatus.

6. The image capturing apparatus according to claim 5, wherein the one or more processors is further configured to calculate the correction values using the first shooting condition value and the second shooting condition value at the time of capturing the image.

7. The image capturing apparatus according to claim 1, wherein each of the first shooting condition values includes a focal distance value, and
wherein each of the second shooting condition values includes at least one of a shooting distance value and an aperture value.

8. The image capturing apparatus according to claim 1, wherein the first region further includes information indicating a number of image height values, the third region further includes the image height values, and the fourth region further includes the correction values corresponding to each of the image height values.

9. The image capturing apparatus according to claim 1, wherein the first shooting condition values and the second shooting condition values are discrete values.

10. A lens apparatus attachable to an image capturing apparatus, the lens apparatus comprising:
a storage memory configured to store data including correction values to be used for image correction processing performed by the image capturing apparatus or a signal processing apparatus; and
one or more processors configured to transmit data stored in the storage memory to the image capturing apparatus or the signal processing apparatus,
wherein a data structure of the data to be transmitted by the one or more processors includes:
a first region that stores first information indicating a number of first shooting condition values and second information indicating a number of second shooting condition values in a set of the second shooting condition values;
a second region that stores third information indicating a number of sets of the second shooting condition values;
a third region that stores the first shooting condition values and the sets of the second shooting condition values, a number of the first shooting condition values is indicated by the first information and a number of the sets of the second shooting condition values is indicated by the third information, and each set of the second shooting condition values consisting of the second shooting condition values whose number is indicated by the second information; and a fourth region that stores correction values according to a combination of the first shooting condition values and the second shooting condition values.

11. The lens apparatus according to claim 10, wherein when the number indicated by the third information is larger than one, each of the sets stored in the third region corresponds to a different one of the first shooting condition values, the first shooting condition values being different from each other.

12. The lens apparatus according to claim 10, wherein when the number indicated by the third information is equal to one, a set of the second shooting condition vales corresponds to each of the first shooting condition values.

13. The lens apparatus according to claim 10, wherein the one or more processors transmits, to the image capturing apparatus, a first shooting condition value and a second shooting condition value at the time of capturing an image.

14. The lens apparatus according to claim 10,
wherein each of the first shooting condition values includes a focal distance value, and
wherein each of the second shooting condition values includes at least one of a shooting distance value and an aperture value.

15. The lens apparatus according to claim 10, wherein the first region further includes information indicating a number of image height values, the third region further includes the image height values, and the fourth region further includes the correction values corresponding to each of the image height values.

16. The lens apparatus according to claim 10, wherein the first shooting condition values and the second shooting condition values are discrete values.

17. A signal processing apparatus comprising:
one or more processors configured to:
acquire data used for image correction processing from an external apparatus; and
perform image correction processing based on the data acquired by from the external apparatus,
wherein a data structure of the data acquired includes:
a first region that stores first information indicating a number of first shooting condition values and second information indicating a number of second shooting condition values in a set of the second shooting condition values;
a second region that stores third information indicating a number of sets of the second shooting condition values;
a third region that stores the first shooting condition values and the sets of the second shooting condition values, a number of the first shooting condition values is indicated by the first information and a number of the sets of the second shooting condition values is indicated by the third information, and each set of the second shooting condition values consisting of the second shooting condition values whose number is indicated by the second information; and a fourth region that stores correction values according to a combination of the first shooting condition values and the second shooting condition values.

18. The signal processing apparatus according to claim 17, wherein when the number indicated by the third information is larger than one, each of the sets stored in the third region corresponds to a different one of the first shooting condition values, the first shooting condition values being different from each other.

19. The signal processing apparatus according to claim 17, wherein when the number indicated by the third information is equal to one, a set of the second shooting condition values corresponds to each of the first shooting condition values.

20. The signal processing apparatus according to claim 17, wherein the one or more processors performs the image correction processing using the correction values stored in the fourth region according to a first shooting condition value and a second shooting condition value at the time of capturing an image.

21. The signal processing apparatus according to claim 17, wherein the one or more processors acquires the first shooting condition values and the second shooting condition values at the time of capturing an image, from the external apparatus.

22. The signal processing apparatus according to claim 17, wherein the one or more processors is further configured to calculate the correction value using the first shooting condition value and the second shooting condition value at the time of capturing an image.

23. The signal processing apparatus according to claim 17,
wherein each of the first shooting condition values includes a focal distance value, and
wherein each of the second shooting condition values includes at least one of a shooting distance value and an aperture value.

24. The signal processing apparatus according to claim 17, wherein the first region further includes information indicating a number of image height values, the third region further includes the image height values, and the fourth region further includes the correction values corresponding to each of the image height values.

25. The signal processing apparatus according to claim 17, wherein the first shooting condition values and the second shooting condition values are discrete values.

26. The signal processing apparatus according to claim 17, wherein the external apparatus is a lens apparatus.

* * * * *